US012548055B2

United States Patent
Scheibelhut et al.

(10) Patent No.: US 12,548,055 B2
(45) Date of Patent: Feb. 10, 2026

(54) USING A GENERATIVE ARTIFICIAL INTELLIGENCE MODEL TO GENERATE A PERSONALIZED IMAGE OF A CATALOG ITEM

(71) Applicant: Maplebear Inc., San Francisco, CA (US)

(72) Inventors: Brent Scheibelhut, Toronto (CA); Naval Shah, Toronto (CA); Mark Oberemk, Toronto (CA); Madeline Mesard, New York, NY (US); Akshay Bagai, Oakville (CA); Charles Wesley, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 94 days.

(21) Appl. No.: 18/616,185

(22) Filed: Mar. 26, 2024

(65) Prior Publication Data

US 2025/0307892 A1    Oct. 2, 2025

(51) Int. Cl.
| | | |
|---|---|---|
| *G06Q 30/06* | (2023.01) | |
| *G06N 20/00* | (2019.01) | |
| *G06Q 30/0601* | (2023.01) | |

(52) U.S. Cl.
CPC ....... *G06Q 30/06212* (2025.08); *G06N 20/00* (2019.01); *G06Q 30/0621* (2013.01); *G06Q 30/0643* (2013.01); *G06Q 30/06433* (2025.08)

(58) Field of Classification Search
CPC ......... G06Q 30/06212; G06Q 30/0621; G06Q 30/0643; G06Q 30/06433; G06N 20/00
(Continued)

(56) References Cited

U.S. PATENT DOCUMENTS

| | | | |
|---|---|---|---|
| 11,756,106 B1 * | 9/2023 | Jaffery | G06Q 30/0643 705/26.7 |
| 2022/0044299 A1 * | 2/2022 | Tate | G06Q 10/087 |

(Continued)

FOREIGN PATENT DOCUMENTS

| | | | | | |
|---|---|---|---|---|---|
| CN | 102318327 A | * | 1/2012 | | H04W 4/08 |
| JP | 2022013921 A | * | 1/2022 | | G06Q 30/0631 |

OTHER PUBLICATIONS

Zhaoxuan Tan, Meng Jiang ; "User Modeling in the Era of Large Language Models: Current Research and Future Directions"; published arXiv:2312.11518v2 [cs.CL.] Dec. 23, 2023 retrieved from IP. Com On Aug. 25, 2025; (Year: 2023).*

*Primary Examiner* — Yogesh C Garg
(74) *Attorney, Agent, or Firm* — Fenwick & West LLP

(57) ABSTRACT

An online system retrieves a set of user data for a user and applies a machine-learning model to predict a measure of preference of the user associated with an item category based on the set of user data. For an item included in the item category, the online system generates a prompt requesting generation of an image of the item that is consistent with the predicted measure of preference of the user associated with the item category. The online system provides the prompt to a generative artificial intelligence model to obtain an output and extracts, from the output, the image of the item that is consistent with the predicted measure of preference of the user associated with the item category. The online system then updates a database of items by storing the extracted image of the item in a database record associated with the item.

20 Claims, 6 Drawing Sheets

(58) Field of Classification Search
USPC .......................................................... 705/26.5
See application file for complete search history.

(56) References Cited

U.S. PATENT DOCUMENTS

| | | | |
|---|---|---|---|
| 2022/0245699 A1* | 8/2022 | Wadhwa | G06F 16/9538 |
| 2025/0054044 A1* | 2/2025 | Scaff | G06F 3/0482 |
| 2025/0159276 A1* | 5/2025 | Doken | H04N 21/4725 |

* cited by examiner

USING A GENERATIVE ARTIFICIAL INTELLIGENCE MODEL TO GENERATE A PERSONALIZED IMAGE OF A CATALOG ITEM

BACKGROUND

Online systems, such as online concierge systems, may allow their users to place orders by selecting items to include in the orders. For example, an online system may present a user with images, descriptions, prices, and other types of information associated with items included among an inventory at a retailer location operated by a grocery retailer and the user may place an order with the online system by selecting various items (e.g., produce, meat, dairy, etc.) to add to their order. In this example, when placing the order, the user also may specify a delivery location to which the ordered items are to be delivered and a timeframe during which the items should be delivered. The orders are then matched with pickers who service the orders on behalf of the users (e.g., by driving to retailer locations, collecting items included in the orders, and delivering the orders to the users).

Due to natural variation among different types of items and user preferences associated with the items, when placing orders, online system users may be presented with images of items that do not reflect their preferences. In the above example, suppose that an image of a steak is presented to the user and that the user prefers a certain amount of marbling for steaks. In this example, if the image is a default image that is shown to all users, regardless of their preferences, the image may depict a steak with an amount of marbling that is not appealing to the user. Alternatively, in the above example, if the online system is able to receive an input from the user describing their ideal steak to customize the image of the steak for the user, the user may have difficulty articulating the amount of marbling they desire. As a result of the inability of online systems to present images of items that reflect the users' preferences, users may not find the items appealing, which may negatively affect their ordering experience.

SUMMARY

In accordance with one or more aspects of the disclosure, an online system uses a generative artificial intelligence model to generate an image of an item based on a predicted measure of preference of a user associated with an item category. More specifically, an online system retrieves a set of user data for a user of the online system and applies a machine-learning model to predict a measure of preference of the user associated with an item category based on the set of user data for the user. For an item included in the item category, the online system generates a prompt that requests generation of an image of the item that is consistent with the predicted measure of preference of the user associated with the item category. The online system provides the prompt to a generative artificial intelligence model to obtain an output and extracts, from the output, the image of the item that is consistent with the predicted measure of preference of the user associated with the item category. The online system then updates a database of items by storing the extracted image of the item in a database record associated with the item. In one or more embodiments, the extracted image of the item is stored in association with information identifying the user or a user cohort to which the user is assigned. In one or more embodiments, the database record associated with the item includes multiple images of the item, in which each image of the item is stored in association with information identifying a user or a user cohort.

DETAILED DESCRIPTION

Figure 1:
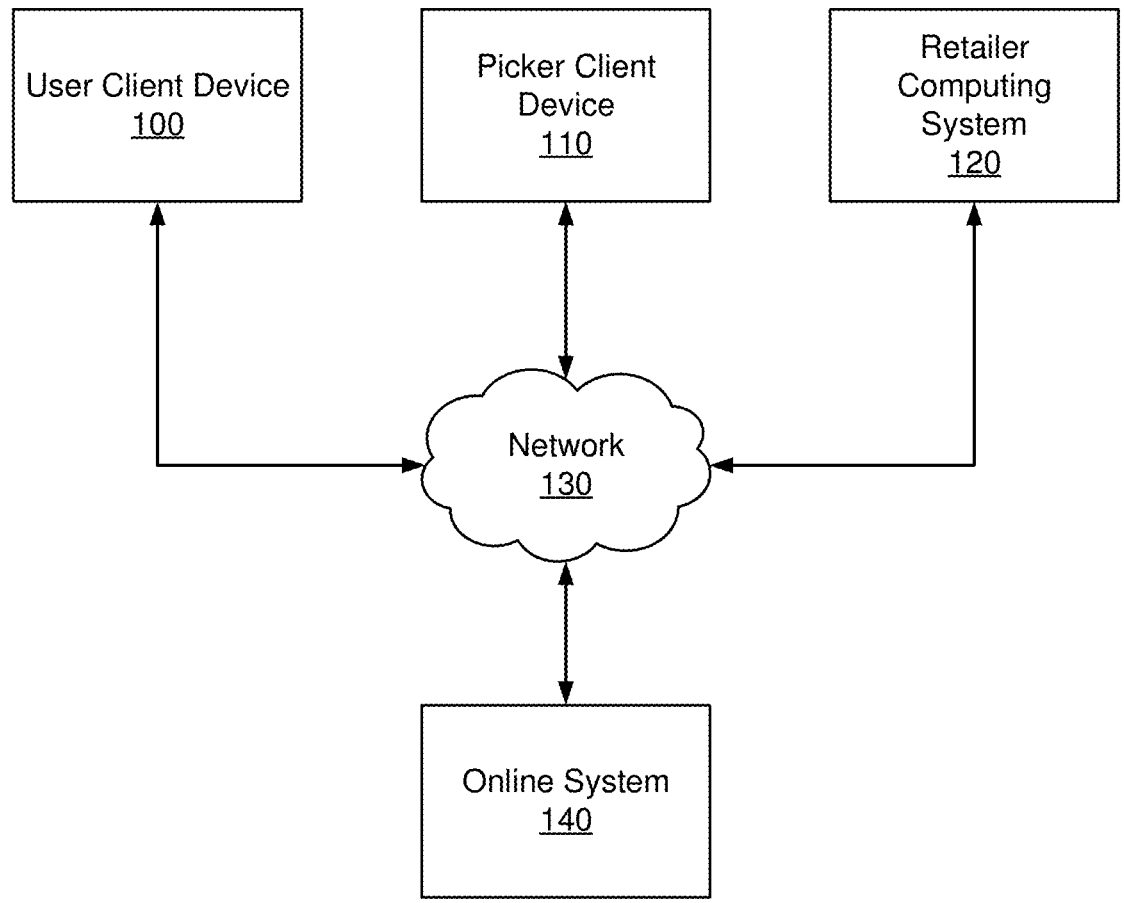
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a user client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online system 140. As such, there may be more than one user client device 100, picker client device 110, or retailer computing system 120.

The user client device 100 is a client device through which a user may interact with the picker client device 110, the retailer computing system 120, or the online system 140. The user client device 100 may be a personal or mobile computing device, such as a smartphone, a tablet, a laptop computer, or a desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, refers to a good or product that may be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user may use to place an order with the online system 140. The ordering interface may be part of a client application operating on the user client device 100. The ordering interface allows the user to search for items that are available through the online system 140 and the user may select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the items should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

In various embodiments, a user may use a user client device 100 during a shopping session at a retailer location. As used herein, a "shopping session" refers to an in-person visit to a retailer location by a user or a picker. In such embodiments, the user client device 100 may be a smart shopping cart, which may include a wheeled cart, a shopping basket, etc. that may be used to carry items collected by the user. The smart shopping cart also may include a display area, various sensors (e.g., a scale, cameras, microphones, GPS sensors, etc.), speakers, buttons, or any other suitable components. A user may interact with the smart shopping cart via one or more of the components. For example, if a display area of the smart shopping cart is a touch-screen, a user may interact with the display area to initiate a shopping session, to authenticate the user, to search for items, to view promotions or items in their shopping list, etc. Sensors of the smart shopping cart may have capabilities to identify physical objects or to determine their attributes. For example, sensors of the smart shopping cart may include interior-facing cameras that capture images or videos of items placed in the smart shopping cart, as well as exterior-facing cameras that capture images or videos of items located elsewhere at a retailer location. In this example, computer-vision techniques may be applied to the images or videos to identify the items in the smart shopping cart or within a threshold distance of the smart shopping cart depicted by the images/videos. In the above example, the sensors of the smart shopping cart also may include a laser sensor or an ultrasonic sensor that determines one or more dimensions of each item and a scale that determines the weight of each item in the smart shopping cart.

One or more sensors of a user client device 100 associated with a user may collect contextual information associated with the user during a shopping session. Contextual information may only be collected if a user has previously explicitly consented to the collection of contextual information associated with the user during the user's shopping session. Contextual information may describe a set of items collected by a user (e.g., items within a shopping basket being used by the user), a state of the user (e.g., whether the user is moving or stationary, a velocity or an orientation of the user, etc.), a location associated with the user (e.g., in a department or at a checkout stand within a retailer location), etc. Contextual information also may include image data, video data, audio data, etc. that may be collected by one or more sensors of a user client device 100 associated with a user. For example, contextual information associated with a user may include instructions provided by the user to a butcher at a retailer location (e.g., "Two ribeyes, one-and-a-half-inch thick, with more marbling please"), as well as images depicting an item subsequently added to a smart shopping cart being used by the user. In this example, the contextual information also may include a location associated with the user within the retailer location (e.g., a location of a user client device 100 associated with the user), a distance between this location and a location associated with the item (e.g., a department in which the item may be found), and attributes (e.g., a dimension, a weight, etc.) of the item. Contextual information also may be associated with various types of data, such as a name of a retailer that operates a retailer location at which the contextual information was collected, a geographical location associated with the retailer location, a time at which the contextual information was collected, information identifying a user or a purchase associated with the contextual information, etc. Once collected by the user client device 100, contextual information may be transmitted to the online system 140 via the network 130.

The picker client device 110 is a client device through which a picker may interact with the user client device 100, the retailer computing system 120, or the online system 140. The picker client device 110 may be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the user's order to the picker in a collection interface. The collection interface is a user interface that provides information to the picker identifying items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer location, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker may use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

In various embodiments, the picker client device 110 may be a smart shopping cart a picker may use during a shopping session at a retailer location. As described above, the smart shopping cart may include a wheeled cart, a shopping basket, etc. that may be used to carry items collected by the picker, as well as various components (e.g., a display area, various sensors, speakers, buttons, etc.). A picker may interact with the smart shopping cart via one or more of the components. For example, if a display area of the smart shopping cart is a touch-screen, a picker may interact with the display area to initiate a shopping session, to authenticate the picker, to search for items, to view items in an order to be collected or instructions for collecting the items, etc. As also described above, sensors of the smart shopping cart may have capabilities to identify physical objects or to determine their attributes.

One or more sensors of a picker client device 110 associated with a picker may collect contextual information associated with the picker during a shopping session. Contextual information may only be collected if a picker has previously explicitly consented to the collection of contextual information associated with the picker during the picker's shopping session. Contextual information may describe a set of items collected by a picker (e.g., items within a shopping basket being used by the picker), a state of the picker (e.g., whether the picker is moving or stationary, a velocity or an orientation of the picker, etc.), a location associated with the picker (e.g., in a department or at a checkout stand within a retailer location), etc. Contextual information also may include image data, video data, audio data, etc. that may be collected by one or more sensors of a picker client device 110 associated with a picker. Contextual information also may be associated with various types of data, such as a name of a retailer that operates a retailer location at which the contextual information was collected, a geographical location associated with the retailer location, a time at which the contextual information was collected, information identifying a picker or an order associated with the contextual information, etc. Once collected by the picker client device 110, contextual information may be transmitted to the online system 140 via the network 130.

When the picker has collected all of the items for an order, the picker client device 110 provides instructions to a picker for delivering the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a particular retailer location and the quantities of those items. Additionally, the retailer computing system 120 may transmit updated item data to the online system 140 when an item is no longer available at the retailer location. Furthermore, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The user client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which users can order items to be provided to them by a picker from a retailer. The online system 140 receives orders from a user client device 100 through the network 130. The online system 140 selects a picker to service the user's order and transmits the order to a picker client device 110 associated with the picker. The picker collects the ordered items from a retailer location and delivers the ordered items to the user. The online system 140 may charge a user for the order and provide portions of the payment from the user to the picker and the retailer. As an example, the online system 140 may allow a user to order groceries from a grocery store retailer. The user's order may specify which groceries they want delivered from the grocery store and the quantities of each of the groceries. The user's client device 100 transmits the user's order to the online system 140 and the online system 140 selects a picker to travel to the grocery store retailer location to collect the groceries ordered by the user. Once the picker has collected the groceries ordered by the user, the picker delivers the groceries to a location transmitted to the picker client device 110 by the online system 140. The online system 140 is described in further detail below with regards to FIG. 2.

Figure 2:
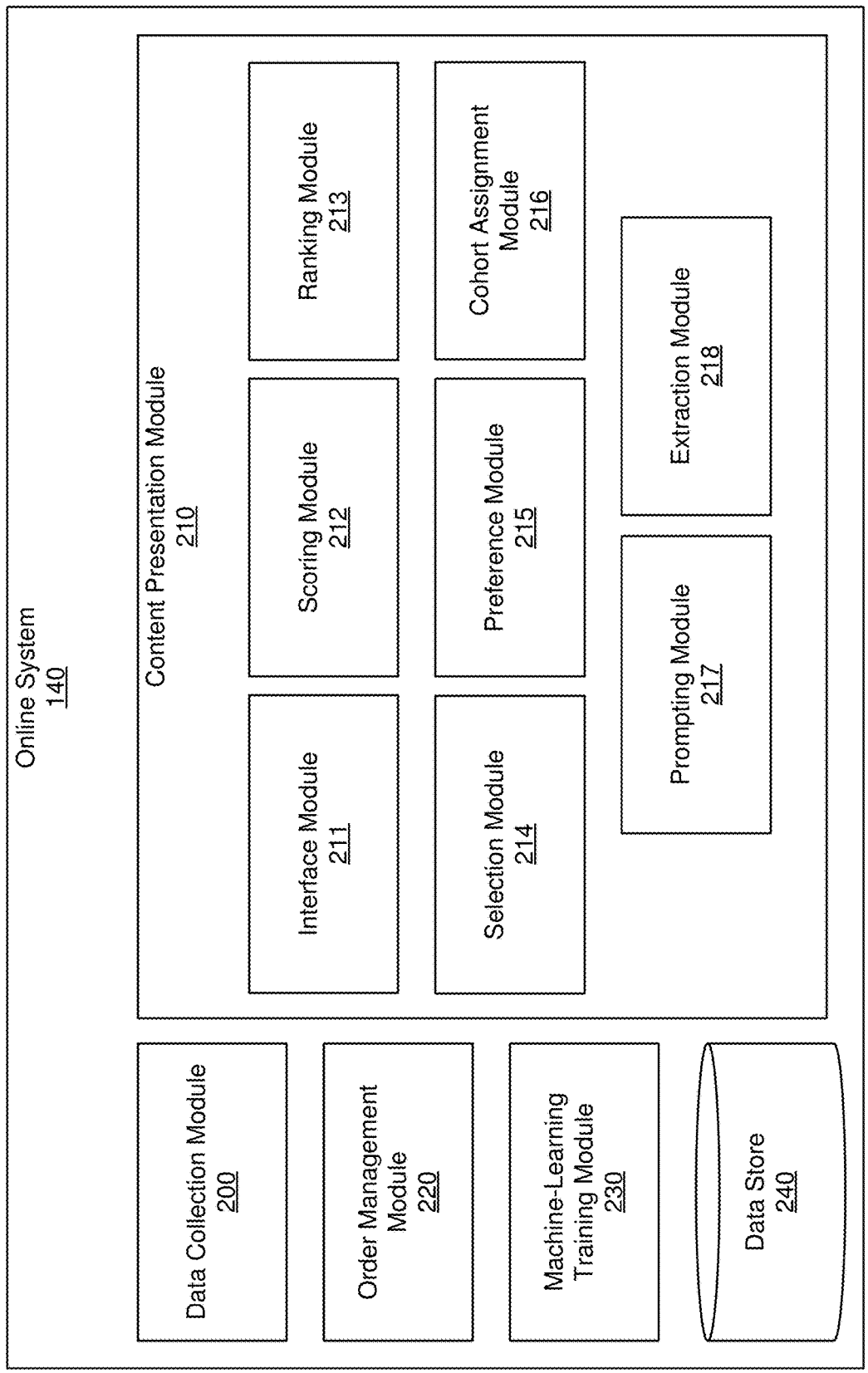
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects user data, which is information or data describing characteristics of a user. User data may include a user's name, address, shopping preferences, favorite items, dietary restrictions/preferences, or stored payment instruments. User data also may include demographic information associated with a user (e.g., age, gender, geographical region, etc.) or household information associated with the user (e.g., a number of people in the user's household, whether the user's household includes children or pets, etc.). The user data also may include default settings established by the user, such as a default retailer/retailer location, payment instrument, delivery location, or delivery timeframe. In some embodiments, user data includes information describing one or more user cohorts to which a user is assigned by the cohort assignment module 216 of the content presentation module 210, as described below.

User data further may include historical information (e.g., historical order, purchase, or interaction information) associated with a user. For example, user data may include historical order information describing previous orders placed by a user with the online system 140 and may include information describing one or more items included in each order (e.g., an item category, a size, a brand, a quantity, a price, etc. associated with each item), as well as a review, a rating, or instructions associated with each order provided by the user. In the above example, the user data also may include information indicating whether one or more items were removed from or replaced in each order, whether each order was associated with an issue, a complaint, a refund, a cancellation, etc. As an additional example, user data may include historical purchase information describing previous purchases made by a user at a retailer location and may include information describing one or more items included in each purchase, as well as image data, video data, audio data, or any other suitable types of contextual information captured during a shopping session associated with each purchase. As yet another example, user data may include historical interaction information describing previous interactions by a user with items, recipes, or other types of content (e.g., coupons, advertisements, etc.) presented by the online system 140 and may describe the items (e.g., images or videos of the items presented to the user or item categories, prices, etc. associated with the items), the recipes (e.g., ingredients of the recipes), or the other types of content (e.g., items associated with coupons, advertisements, etc.). In the above example, the historical interaction information also may describe previous interactions by the user with individuals (e.g., pickers, employees associated with retailer locations, etc.), such as one or more exchanges of information (e.g., instructions) between the user and the individuals (e.g., via a user client device 100 associated with the user and a picker client device 110 associated with a picker). In the above examples, the user data may also describe the types of interactions (e.g., verbal or written) and the times of the interactions (e.g., a timestamp associated with each interaction).

User data also may include a measure of preference of a user or a user cohort associated with an item category. As described below, an item category is a set of items that are a similar type of item. The measure of preference of the user or the user cohort associated with the item category may correspond to one or more values describing a quantity, an amount, a percentage, or any other suitable measurement of an attribute (e.g., size, color, weight, etc.) of a set of items included in the item category the user or the user cohort prefers. For example, a measure of preference of a user associated with a "steak" item category may correspond to a value describing an amount of a marbling attribute associated with a set of items included in the item category the user prefers. In the above example, another measure of preference of the user associated with the item category may correspond to a value describing a measurement of a thickness attribute associated with the set of items included in the item category the user prefers. The measure of preference of the user or the user cohort associated with the item category may be received from the user (e.g., via a survey, a questionnaire, etc. sent to a user client device 100 associated with the user) or it may be derived or predicted, as described below. The data collection module 200 may collect the user data from sensors on the user client device 100 or based on the user's interactions with the online system 140. The data collection module 200 also may collect the user data from the preference module 215 or the cohort assignment module 216 of the content presentation module 210, as further described below.

The data collection module 200 also collects item data, which is information or data identifying and describing items that are available at a retailer location. The item data may include item identifiers for items that are available and may include quantities of items associated with each item identifier. Additionally, item data may also include attributes of items such as the sizes, colors, weights, stock keeping units (SKUs), serial numbers, prices, item categories, brands, qualities (e.g., freshness, ripeness, etc.), ingredients, materials, manufacturing locations, versions/varieties (e.g., flavors, low fat, gluten-free, organic, etc.), or any other suitable attributes of the items. Item data also may include image data, video data, audio data, or any other suitable types of data associated with items. For example, item data for an item may include images or videos depicting the item or verbal instructions mentioning the item captured during shopping sessions of users or pickers at retailer locations. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), the rate at which the item is found, or the popularity of the item.

The data collection module 200 may maintain the item data in a database of items. Each database record in the database of items may be associated with an item included among an inventory at a retailer location, such that each database record includes a set of item data for a corresponding item. For example, a database record associated with an item may include a set of images of the item. When the data collection module 200 receives item data for an item (e.g., from the extraction module 218 of the content presentation module 210 described below), the data collection module 200 may update the database of items by storing the item data in a database record associated with the item. In the above example, when the data collection module 200 receives an image of the item, the data collection module 200 may update the database of items by storing the image in the database record associated with the item. In some embodiments, a set of item data for an item is associated with a user or a user cohort. In such embodiments, the set of item data is stored in a database record associated with the item in association with information identifying the user or the user cohort. In the above example, if the database record includes multiple images of the item, each image may be associated with a user or a user cohort and stored in association with information identifying the user or the user cohort. The data collection module 200 may collect item data from a retailer computing system 120, a picker client device 110, or a user client device 100. The data collection module 200 also may collect item data from the extraction module 218 of the content presentation module 210, which is described below.

An item category is a set of items that are a similar type of item. Items in an item category may be considered to be equivalent to each other or may be replacements for each other in an order. For example, different brands of sourdough bread may be different items, but these items may be in a "sourdough bread" item category. In some embodiments, item categories may be broader in that the same item category may include item types that are related to a common theme, found in the same department, etc. For example, items such as apples, oranges, lettuce, and cucumbers may be included in a "produce" item category. As an additional example, items such as bread, pasta, and cookies that are gluten-free may be included in a "gluten-free" item category, while items such as tortilla chips and tofu that are non-GMO may be included in a "non-GMO" item category. Furthermore, in various embodiments, an item may be included in multiple categories. For example, croissants may be included in a "croissant" item category, a "pastry" item category, and a "bakery" item category. The item categories may be human-generated and human-populated with items. The item categories also may be generated automatically by the online system 140 (e.g., using a clustering algorithm).

The data collection module 200 also collects picker data, which is information or data describing characteristics of pickers. For example, the picker data for a picker may include the picker's name, the picker's location, how often the picker has serviced orders for the online system 140, a user rating for the picker, the retailers from which the picker has collected items, or the picker's previous shopping history. Additionally, the picker data may include preferences expressed by the picker, such as their preferred retailers for collecting items, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data describing characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, a rating or a review that the user gave the delivery of the order, or a complaint, a refund, an issue, or a cancellation associated with the order. Order data also may include information describing a replacement or a removal of an item included in the order, contextual information associated with a picker captured during a shopping session associated with the order, or any other suitable types of information that may be associated with an order. For example, order data for an order may include various types of data (e.g., image data, video data, or audio data) captured during a shopping session associated with the order, in which the data were captured by a picker client device 110 associated with a picker to whom the order was assigned. In this example, the order data for the order also may include information describing a set of items collected by the picker during the shopping session, such as an item category or other attributes associated with each item. In some embodiments, the order data includes user data for users associated with the order, such as user data for a user who placed the order or picker data for a picker who serviced the order.

The data collection module 200 also may collect recipe data, which is information or data describing characteristics of a recipe. Recipe data for a recipe may include a set of ingredients included in the recipe, an amount or a quantity of each ingredient used to make the recipe, a set of equipment used to make the recipe (e.g., a rolling pin, a food processor, etc.), a set of instructions for making the recipe, or an amount of time required to make the recipe. Recipe data for a recipe also may include additional types of information, such as a set of nutritional information associated with the recipe, a number of servings the recipe yields, a cuisine (e.g., American, Thai, Italian, etc.) associated with the recipe, a meal (e.g., brunch, dessert, etc.) associated with the recipe, or any other suitable types of information that may be associated with a recipe. The data collection module 200 may collect recipe data from a user client device 100 associated with a user of the online system 140, a third-party system (e.g., a website or an application), or any other suitable source.

In some embodiments, the data collection module 200 also may derive information from other data stored in the data store 240 and then store this derived information in the data store 240 (e.g., in association with the data from which it was derived). For example, suppose that a set of user data for a user describes previous orders placed by the user with the online system 140 or previous purchases made by the user at retailer locations. In the above example, based on the previous orders/purchases made by the user, the data collection module 200 may derive a frequency with which the user orders/purchases items associated with various attributes (e.g., an item category, a ripeness, a color, a brand, a weight, etc. associated with each item), a percentage of items the user orders/purchases that are on sale, and types of items that the user orders/purchases from a particular retailer/retailer location.

Information derived by the data collection module 200 also may indicate whether a review for an order is positive or negative or whether a review or an exchange of information (e.g., a set of instructions provided by a user) associated with an order or a purchase applies to a particular item or item category. For example, the data collection module 200 may derive information indicating that a user has a preference for an attribute corresponding to a green color that applies to a "banana" item category if instructions associated with an order placed by the user states: "I only want green bananas." As an additional example, the data collection module 200 may derive information indicating that a review is negative and applies to a "red peppers" item category and a "tomatoes" item category if the review states: "Asked for red peppers but got tomatoes." As yet another example, if a review for an order states: "Great job replacing the Gala apples with Fuji apples!" the data collection module 200 may derive information indicating that the review is positive and applies to an "apple" item category.

Information derived by the data collection module 200 also may indicate whether a particular item matches a user's instructions or preferences associated with the item or an item category that includes the item. The data collection module 200 may derive this information based on a set of rules that may make one or more assumptions. For example, a rule may assume that a set of attributes (e.g., brand, weight, version/variety, etc.) of each item a user purchases at a retailer location matches a set of instructions associated with the item provided by the user or the user's preferences associated with an item category that includes the item. As an additional example, a rule may assume that a particular item does not match a user's preferences associated with the item or an item category that includes the item if a set of conditions associated with the item are met. In this example, the set of conditions may require the following: the user purchases the item at a retailer location with at least a threshold frequency, the user did not purchase the item during a shopping session at the retailer location, the item was available at the retailer location during the shopping session, and a distance between a location associated with the user and a location associated with the item was less than a threshold distance during the shopping session, such that the user likely saw the item. As yet another example, a rule may assume that a particular item matches a user's preferences associated with the item or an item category that includes the item if the user ordered the item and provided a positive review that applies to the item. In this example, the rule also may assume that the particular item does not match the user's preferences associated with the item or the item category if the user provided a negative review or a complaint that applies to the item or if the user received a refund for the item. The data collection module 200 may derive information using various techniques, such as natural language processing (NLP), computer-vision, speech recognition, or any other suitable techniques.

The following example illustrates how the data collection module 200 may derive information indicating a particular item matches a user's instructions or preferences associated with the item or an item category that includes the item. Suppose that historical purchase information associated with a user includes the following verbal instructions provided by the user to an employee associated with a retailer location during a shopping session: "Two ribeyes, one-and-a-half-inch thick, with more marbling please." In this example, suppose that the historical purchase information also includes images or videos depicting two ribeye steaks subsequently purchased by the user during the shopping session, as well as information describing attributes (e.g., dimensions) of each ribeye steak. In the above example, based on a rule, the data collection module 200 may derive information indicating that the ribeye steaks depicted by the images or videos and the attributes of the ribeye steaks match the user's instructions or preferences associated with ribeye steaks or a "steak" item category.

The following example illustrates how the data collection module 200 may derive information indicating a particular item does not match a user's instructions or preferences associated with the item or an item category that includes the item. In the above example, suppose instead that the historical purchase information indicates the user did not subsequently purchase any ribeye steaks during the shopping session. In this example, the data collection module 200 may access order data captured by picker client devices 110 associated with pickers collecting items at the retailer location within a threshold amount of time after the verbal instructions were provided by the user, in which the order data includes images or videos depicting ribeye steaks and information describing attributes of the ribeye steaks. Continuing with this example, based on a rule, the data collection module 200 may derive information indicating that the ribeye steaks depicted by the images or videos or the attributes of the ribeye steaks do not match the user's instructions or preferences associated with ribeye steaks or the "steak" item category. In this example, absent the verbal instructions provided by the user, the data collection module 200 also may derive this information based on one or more additional rules or additional types of information stored in the data store 240. In the above example, the additional types of information may include historical purchase information indicating that the user purchases ribeye steaks from the retailer location with at least a threshold frequency and that a distance between a location of a user client device 100 associated with the user and a location of the ribeye steaks at the retailer location was less than a threshold distance during the shopping session. In the above example, the additional types of information also may include other verbal exchanges of information between the user and the employee during the shopping session (e.g., "No, thank you. Those are too thick and don't have enough marbling").

The content presentation module 210 selects content for presentation to a user. For example, the content presentation module 210 selects which items to present to a user while the user is placing an order. Components of the content presentation module 210 include: an interface module 211, a scoring module 212, a ranking module 213, a selection module 214, a preference module 215, a cohort assignment module 216, a prompting module 217, and an extraction module 218, which are further described below.

The interface module 211 generates and transmits an ordering interface for the user to order items. The interface module 211 populates the ordering interface with items that the user may select for adding to their order. In some embodiments, the interface module 211 presents a catalog of all items that are available to the user, which the user can browse to select items to order. Other components of the content presentation module 210 may identify items that the user is most likely to order and the interface module 211 may then present those items to the user. For example, the scoring module 212 may score items and the ranking module 213 may rank the items based on their scores. In this example, the selection module 214 may select items with scores that exceed some threshold (e.g., the top n items or the p percentile of items) and the interface module 211 then displays the selected items. In some embodiments, the interface module 211 populates the ordering interface with images of items based on user data for users to whom the ordering interface is to be presented. In various embodiments, the interface module 211 populates the ordering interface with additional types of information (e.g., one or more videos, descriptions, etc.) associated with items based on user data for users to whom the ordering interface is to be presented.

The following illustrates an example of how the interface module 211 may generate the ordering interface. Suppose that a request is received from a user client device 100 associated with a user to access the ordering interface. In this example, once the selection module 214 selects an item, it may access the database of items stored in the data store 240 and retrieve a database record associated with the item. In the above example, the selection module 214 may then retrieve one or more images of the item from the database record stored in association with information identifying the user. Alternatively, in this example, the selection module 214 may access a set of user data for the user stored in the data store 240, retrieve information describing a user cohort to which the user is assigned, and retrieve one or more images of the item from the database record stored in association with information identifying the user cohort. Continuing with this example, the interface module 211 may then include the image(s) of the item in the ordering interface when generating the ordering interface and send the ordering interface to the user client device 100 associated with the user, causing the user client device 100 to display the ordering interface. In the above example, the selection module 214 also may retrieve other types of item data for the item from the database record (e.g., one or more videos depicting the item, a description of the item, etc.) that are stored in association with information identifying the user or the user cohort and the interface module 211 may include the item data for the item in the ordering interface.

The scoring module 212 may use an item selection model to score items for presentation to a user. An item selection model is a machine-learning model that is trained to score items for a user based on item data for the items and user data for the user. For example, the item selection model may be trained to determine a likelihood that the user will order an item. In some embodiments, the item selection model uses item embeddings describing items and user embeddings describing users to score items. These item embeddings and user embeddings may be generated by separate machine-learning models and may be stored in the data store 240.

In some embodiments, the scoring module 212 scores items based on a search query received from the user client device 100. A search query is free text for a word or set of words that indicate items of interest to the user. The scoring module 212 scores items based on a relatedness of the items to the search query. For example, the scoring module 212 may apply natural language processing (NLP) techniques to the text in the search query to generate a search query representation (e.g., an embedding) that represents characteristics of the search query. The scoring module 212 may use the search query representation to score candidate items for presentation to a user (e.g., by comparing a search query embedding to an item embedding).

In some embodiments, the scoring module 212 scores items based on a predicted availability of an item. The scoring module 212 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The scoring module 212 may apply a weight to the score for an item based on the predicted availability of the item. Alternatively, an item may be filtered out from presentation to a user by the selection module 214 based on whether the predicted availability of the item exceeds a threshold.

The preference module 215 may retrieve various types of data (e.g., user data, item data, order data, or recipe data) from the data store 240. For example, the preference module 215 may retrieve a set of user data for a user including historical order information describing previous orders placed by the user, such as items included in each order or information associated with each order provided by the user (e.g., instructions for collecting the items or a review for the order, if any). In the above example, the historical order information also may indicate whether one or more items were removed from or replaced in each order, whether each order was associated with a complaint, a refund, an issue, a cancellation, etc. In this example, the set of user data for the user also may include historical purchase information describing previous purchases made by the user, such as items the user purchased and instructions or preferences verbally expressed by the user during previous shopping sessions. In the above example, the set of user data also may include images or videos depicting items that match the instructions or preferences and attributes (e.g., dimensions, colors, etc.) of the items, as well as similar information associated with items that do not match the instructions or preferences. Continuing with this example, the set of user data retrieved by the preference module 215 also may include historical interaction information describing items added to a shopping list associated with the user and an order in which they were added, as well as a set of dietary preferences associated with the user, demographic and household information associated with the user, etc. In the above example, the preference module 215 also may retrieve a set of recipe data describing recipes the user viewed within a threshold amount of time that one or more of the items were added to the shopping list or recipes that include ingredients matching one or more of the items added to the shopping list. In this example, if the data retrieved by the preference module 215 is associated with one or more items, the preference module 215 also may retrieve a set of item data for each item.

Data that the preference module 215 retrieves from the data store 240 may include explicit or implicit information associated with a user. Explicit information associated with a user may be received from the user and directly express the user's preference associated with an item category. For example, explicit information associated with a user corresponding to historical purchase information associated with the user may directly express a preference of the user for one or more attributes of each item the user purchased. As an additional example, explicit information associated with a user corresponding to verbal instructions provided by the user during a previous shopping session or written instructions associated with an order placed by the user may directly express a preference of the user for a weight attribute and a thickness attribute for ham (e.g., "Half a pound of ham cut into one-quarter inch slices"). Implicit information associated with a user may be received from the user or other users and indirectly express the user's preference associated with an item category. Implicit information associated with a user may include historical order information associated with the user, user data associated with other users having at least a threshold measure of similarity to the user (e.g., similar dietary preferences, demographic information, historical order information, etc.), or any other suitable types of information. For example, implicit information associated with a user corresponding to a percentage of bananas previously ordered by the user that were overripe or a percentage of bananas previously ordered by users having at least a threshold measure of similarity to the user that were overripe indirectly expresses a preference of the user for a ripeness attribute for bananas. In the above example, the preference of the user for overripe bananas may be proportional to the percentage.

The preference module 215 also predicts a measure of preference of a user associated with an item category. The preference module 215 may make the prediction based on various types of data (e.g., user data, item data, order data, or recipe data) it retrieves from the data store 240 or based on any other suitable types of data. For example, suppose that the preference module 215 retrieves a set of historical interaction information describing items added to a shopping list associated with a user and recipe data for a banana bread recipe the user browsed within a threshold amount of time of adding the items to the shopping list. In this example, if the recipe calls for overripe bananas and the user has indicated that they are making the recipe (e.g., at least a threshold number of items in the shopping list match ingredients of the recipe), the preference module 215 may predict a measure of preference of the user associated with a "banana" item category corresponding to a value describing a measurement of a ripeness attribute. In this example, if the preference module 215 also retrieves historical purchase information for other users, the measure of preference predicted by the preference module 215 may be proportional to an average ripeness of bananas previously purchased by users who also indicated they were making the same or a similar recipe. As an additional example, suppose that the preference module 215 retrieves historical interaction information describing images depicting different colors of sweet bell peppers (e.g., red, orange, or yellow) with which a user previously interacted (e.g., by adding the sweet bell peppers to a shopping list associated with the user). In this example, the preference module 215 may predict a measure of preference of the user associated with a "sweet bell pepper" item category corresponding to one or more values (e.g., red, green and blue values) describing a measurement of a color attribute the user prefers corresponding to a color of sweet bell pepper depicted by the images with which the user interacted most frequently.

When predicting a measure of preference of a user associated with an item category, the preference module 215 may associate different weights with different types of information used to make the prediction. The preference module 215 may do so based on whether the measure of preference is being predicted based on explicit or implicit information associated with the user (e.g., by weighting explicit information more heavily than implicit information). For example, suppose that the preference module 215 retrieves historical purchase information for a user including images depicting a ribeye steak the user purchased during a previous shopping session and information describing a thickness of the steak. In this example, the preference module 215 may predict a measure of preference of the user associated with a "steak" item category corresponding to a value describing a measurement of a thickness attribute or an amount of a marbling attribute the user prefers. In the above example, when predicting the measure of preference of the user associated with the item category, the preference module 215 may weight the images or thickness more heavily than similar information associated with steaks included in previous purchases made by users having at least a threshold measure of similarity to the user. Similarly, in the above example, the preference module 215 may weight the images or thickness more heavily than similar information associated with steaks included in previous orders placed by the user that were not associated with explicit feedback (e.g., positive or negative reviews, complaints, refunds, etc.).

In some embodiments, the preference module 215 predicts a measure of preference of a user associated with an item category using a preference prediction model. A preference prediction model is a machine-learning model trained to predict a measure of preference of a user associated with an item category. To use the preference prediction model, the preference module 215 may access the model (e.g., from the data store 240) and apply the model to a set of inputs. The set of inputs may include various types of data retrieved by the preference module 215 described above (e.g., user data, item data, order data, or recipe data). Once the preference module 215 applies the preference prediction model to the set of inputs, the preference module 215 may then receive an output from the model. The output may include one or more values corresponding to a predicted measure of preference of a user associated with an item category. Once predicted, a measure of preference of a user associated with an item category may be stored among a set of user data for the user in the data store 240. In some embodiments, the preference prediction model may be trained by the machine-learning training module 230, as described below.

In various embodiments, the preference module 215 predicts a measure of preference of a user cohort associated with an item category. As used herein, a "user cohort" refers to one or more users who share one or more characteristics. Similar to predicting a measure of preference of a user associated with an item category, the preference module 215 may predict a measure of preference of a user cohort associated with an item category based on various types of data (e.g., user data, item data, order data, or recipe data) it retrieves from the data store 240. For example, the preference module 215 may predict a measure of preference of a user cohort associated with a "steak" item category corresponding to a value describing an amount of a marbling attribute associated with a set of items included in the item category the user cohort prefers. In this example, the preference module 215 may make the prediction based on a set of user data for one or more users assigned to the user cohort and a set of item data for the set of items. In the above example, the measure of preference may be proportional to an average amount of marbling depicted by images or videos of items included in the "steak" item category previously purchased by users assigned to the user cohort. The preference module 215 may predict a measure of preference of a user cohort associated with an item category in a manner analogous to that described above (e.g., by associating different weights with different types of information used to make the prediction, by using the preference prediction model, etc.).

The cohort assignment module 216 may assign users to user cohorts. As described above, a user cohort refers to one or more users who share one or more characteristics. The cohort assignment module 216 may assign a user to one or more user cohorts based on user data for the user. For example, the cohort assignment module 216 may assign a user to a first user cohort including users who share a common geographical region and who are between the ages of 35 and 40. In this example, the cohort assignment module 216 also may assign the user to a second user cohort including users who share the common geographical region and/or to a third user cohort including users who are between the ages of 35 and 40. The cohort assignment module 216 also may assign users to user cohorts based on a set of rules (e.g., one or more rules describing user characteristics that the cohort assignment module 216 may use to assign users to user cohorts, one or more rules indicating whether each user may be assigned to more than one user cohort, etc.). In some embodiments, the cohort assignment module 216 uses user embeddings describing users to assign users to user cohorts. These embeddings may be generated by one or more machine-learning models and may be stored in the data store 240. For example, the cohort assignment module 216 may assign users to one or more user cohorts by grouping the users into one or more clusters using an unsupervised learning method (e.g., k-means clustering) based on an embedding representing each user, in which each cluster corresponds to a user cohort. Information identifying one or more user cohorts to which a user is assigned may be stored in association with user data for the user in the data store 240.

For an item included in an item category, the prompting module 217 generates a prompt that requests generation of a set of images of the item that is consistent with a predicted measure of preference of a user or a user cohort associated with the item category. The prompt may include various types of data, such as text data, image data, video data, audio data, or any other suitable types of data. For example, suppose that a predicted measure of preference of a user associated with an item category corresponds to a value describing an amount of a marbling attribute associated with a set of items included in a "steak" item category the user prefers. In this example, the prompt may include instructions to generate an image of a ribeye steak that is consistent with the predicted measure of preference of the user associated with the item category, as well as images or videos depicting various ribeye steaks with the corresponding amount of marbling (e.g., images or videos depicting ribeye steaks the user previously purchased). In some embodiments, the prompt requests generation of a set of images of an item that is consistent with multiple predicted measures of preference of a user or a user cohort associated with an item category that includes the item. In the above example, if another predicted measure of preference of the user associated with the "steak" item category corresponds to a value describing a measurement of a thickness attribute associated with the set of items included in the item category the user prefers, the prompt also may include instructions to generate the image of the ribeye steak that is consistent with this predicted measure of preference of the user. The prompt also may request generation of a set of videos, a verbal or a written description, or any other suitable types of information describing an item that is consistent with a predicted measure of preference of a user or a user cohort associated with an item category that includes the item.

Once the prompting module 217 generates a prompt, the prompting module 217 may provide the prompt to a generative artificial intelligence (AI) model to obtain an output. The generative AI model may be a multi-modal large language model or any other suitable type of generative AI model. For example, the generative AI model may generate an output that includes images and text from a prompt that also includes images and text. The output of the generative AI model may include a set of images of an item that is consistent with a predicted measure of preference of a user or a user cohort associated with an item category that includes the item. For example, suppose that a prompt provided to the generative AI model requests generation of an image of a ribeye steak that is consistent with a value describing an amount of a marbling attribute and a value describing a measurement of a thickness attribute associated with a set of items included in a "steak" item category a user prefers. In this example, an output of the generative AI model may include an image of a ribeye steak that is consistent with the amount of marbling and the thickness the user prefers. In embodiments in which the prompt provided to the generative AI model requests generation of a set of videos, a verbal or a written description, or any other types of content, an output of the generative AI model may include a corresponding set of videos, verbal or written description, etc. In some embodiments, the generative AI model is trained by the machine-learning training module 230.

The extraction module 218 extracts a set of images from an output of the generative AI model. In embodiments in which the output of the generative AI model includes other types of content (e.g., text, audio, or video content), the extraction module 218 also may extract the content. The extraction module 218 may extract the set of images or other types of content using various techniques. For example, if an output of the generative AI model includes one or more images, the extraction module 218 may extract the image(s) using computer-vision techniques including object detection, image identification, and image classification. As an additional example, if an output of the generative AI model includes text, the extraction module 218 may extract the text by applying one or more natural language processing (NLP) techniques to the output.

Once the extraction module 218 extracts a set of images of an item from an output of the generative AI model, the data collection module 200 may update the database of items by storing the set of images in a database record associated with the item. In embodiments in which the extraction module 218 extracts a set of images of an item generated by the generative AI model for a user (e.g., based on a prompt that requests generation of the set of images of the item that is consistent with a predicted measure of preference of the user associated with an item category that includes the item), the extracted set of images may be stored in association with information identifying the user. For example, suppose that a database record associated with an item includes multiple images of the item, in which each image in the database record is associated with a user and stored in association with information identifying the corresponding user. In this example, an extracted set of images may be stored in association with information identifying a user for whom the set of images was generated. Similarly, in embodiments in which the extraction module 218 extracts a set of images generated by the generative AI model for a user cohort, the extracted set of images may be stored in association with information identifying the user cohort. In the above example, suppose instead that each image in the database record is associated with a user cohort and stored in association with information identifying the corresponding user cohort. In this example, the extracted set of images may be stored in association with information identifying a user cohort to which the user is assigned. In embodiments in which the extraction module 218 extracts other types of content associated with an item generated by the generative AI model, the extracted content may be stored in a manner analogous to that described above.

The order management module 220 manages orders for items from users. The order management module 220 receives orders from user client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by users, or how often the picker agrees to service an order.

In some embodiments, the order management module 220 determines when to assign an order to a picker based on a delivery timeframe requested by the user who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online system 140. The online system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative AI models (e.g., generative adversarial networks, large language models, etc.), or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model is used by the machine-learning model to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network.

The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

In embodiments in which the preference module 215 accesses and applies the preference prediction model to predict a measure of preference of a user or a user cohort associated with an item category, the machine-learning training module 230 may train the preference prediction model. The machine-learning training module 230 may train the preference prediction model via supervised learning or using any other suitable technique or combination of techniques based on various types of data stored in the data store 240. For example, the machine-learning training module 230 may train the preference prediction model based on user data, item data, order data, or recipe data.

To illustrate an example of how the machine-learning training module 230 may train the preference prediction model, suppose that the machine-learning training module 230 receives a set of training examples including various attributes of users of the online system 140 included among historical order, purchase, or interaction information associated with each user (e.g., previous orders placed by each user, recipes accessed by each user, etc.), each user's shopping preferences, favorite items, dietary restrictions/preferences, etc. In the above example, the set of training examples also may include images or videos of items the users previously ordered or purchased, verbal or written instructions associated with the items, attributes of the items, etc. Continuing with this example, the set of training examples also may include attributes of recipes with which the users previously interacted, such as a set of ingredients included in each recipe, an amount or a quantity of each ingredient used to make each recipe, a set of equipment used to make each recipe, etc. In this example, the machine-learning training module 230 also may receive labels which represent expected outputs of the preference prediction model, in which a label corresponds to one or more values describing a quantity, an amount, a percentage, or any other suitable measurement of an attribute (e.g., size, color, weight, etc.) of a set of items included in an item category a user prefers. Alternatively, in the above example, the set of training examples may include various attributes of user cohorts and a label may correspond to one or more values describing a quantity, an amount, a percentage, etc. of a set of items included in an item category a user cohort prefers. Continuing with this example, the machine-learning training module 230 may then train the preference prediction model based on the attributes, as well as the labels by comparing its output from input data of each training example to the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In situations in which the training example includes a label, the loss function is also based on the label for the training example. Some example loss functions include the mean square error function, the mean absolute error, the hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, picker data, and recipe data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 also may store various rules. For example, the data store 240 may store one or more rules the data collection module 200 uses to derive information from other data stored in the data store 240 or one or more rules the cohort assignment module 216 uses to assign users to user cohorts. The data store 240 uses computer-readable media to store data, and may use databases to organize the stored data.

Figure 3:
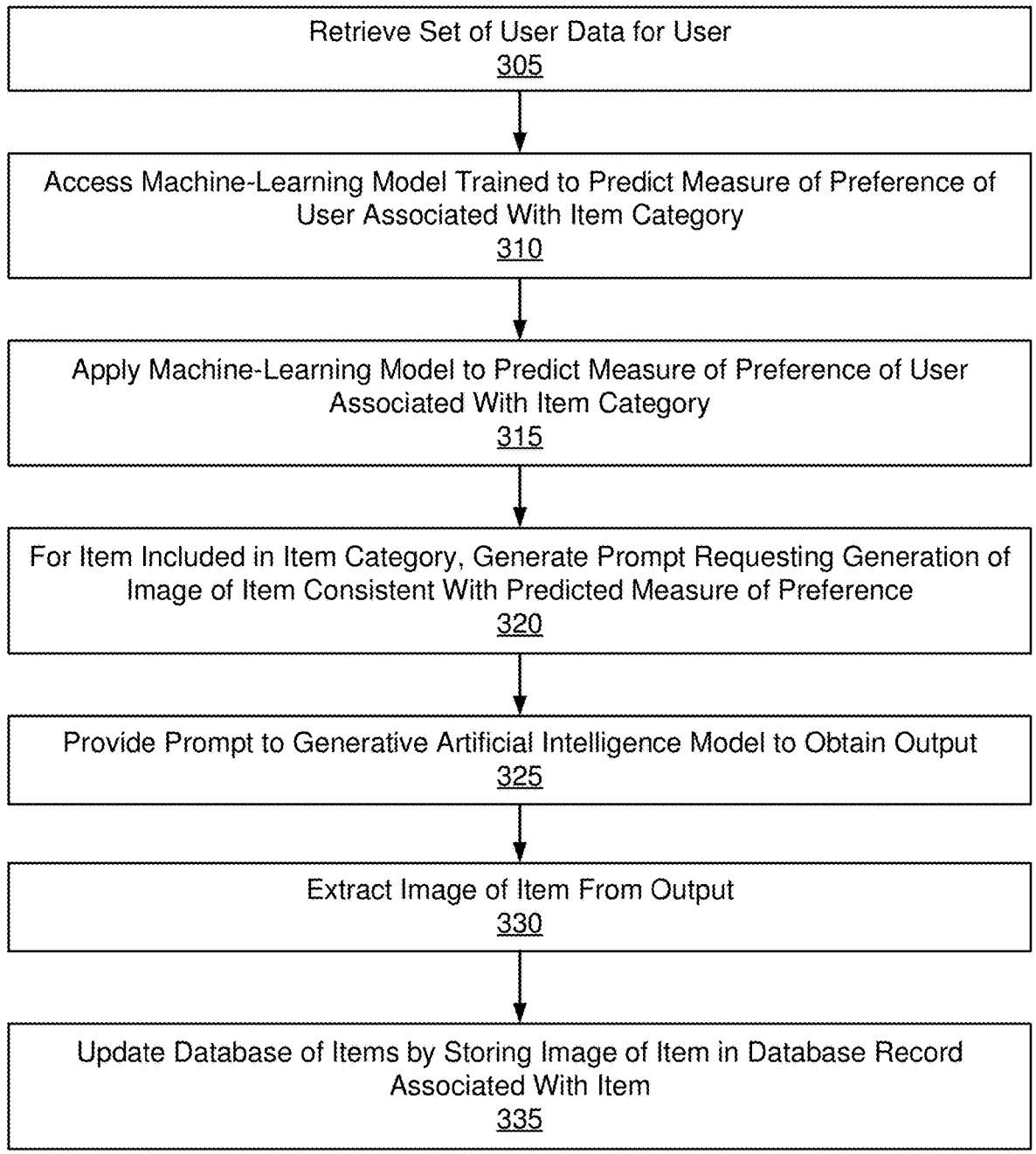
FIG. 3 is a flowchart of a method for using a generative artificial intelligence model to generate an image of an item based on a predicted measure of preference of a user associated with an item category, in accordance with one or more embodiments.

Using a Generative Artificial Intelligence Model to Generate an Image of an Item Based on a Predicted Measure of Preference of a User Associated with an Item Category FIG. 3 is a flowchart of a method for using a generative artificial intelligence model to generate an image of an item based on a predicted measure of preference of a user associated with an item category, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system 140 without human intervention.

Figure 4:
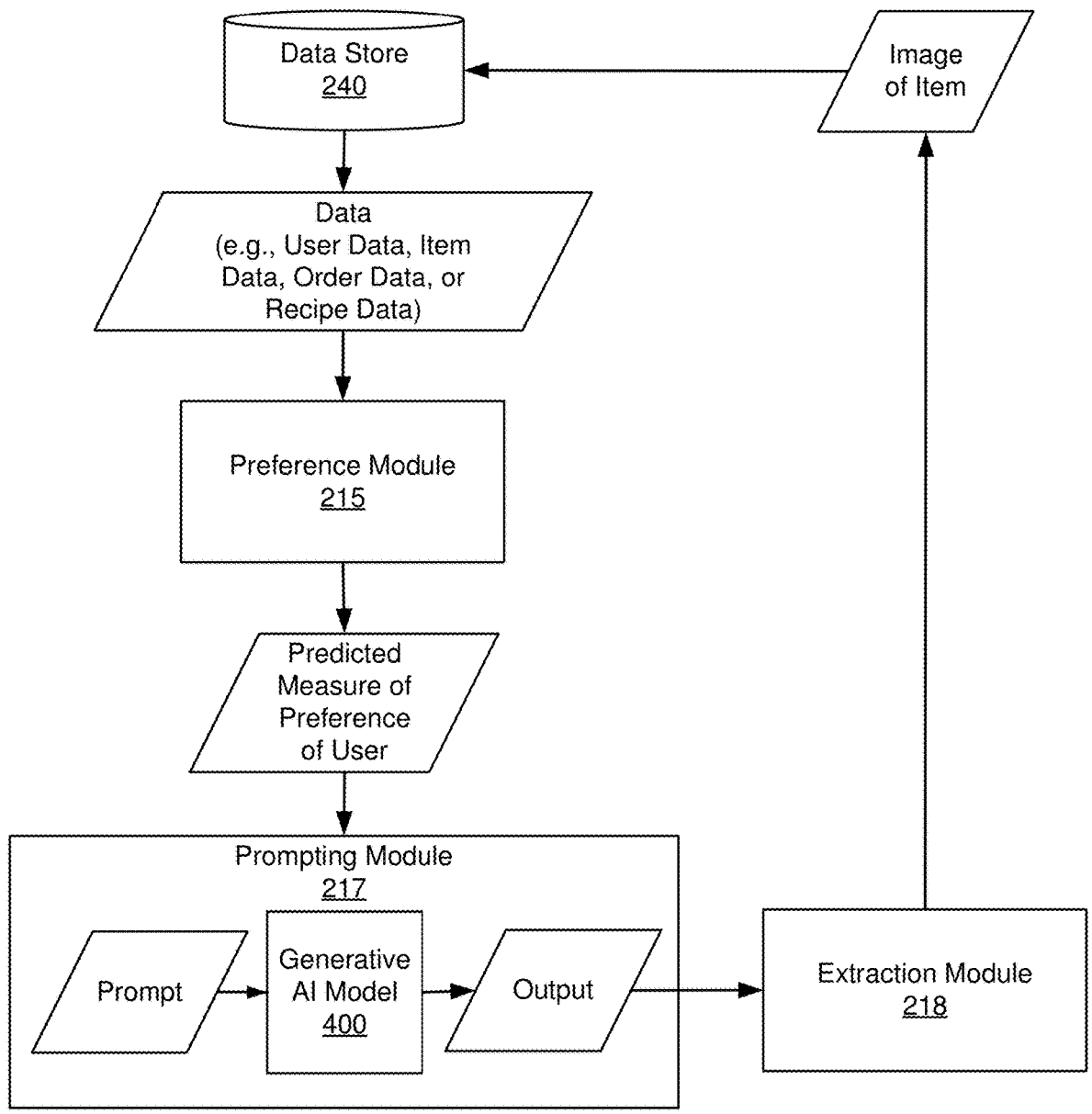
FIG. 4 is a process flow diagram for using a generative artificial intelligence model to generate an image of an item based on a predicted measure of preference of a user associated with an item category, in accordance with one or more embodiments.

The online system 140 retrieves 305 (e.g., using the preference module 215) a set of user data for a user of the online system 140 (e.g., from the data store 240). As shown in FIG. 4, which is a process flow diagram for using a generative artificial intelligence model to generate an image of an item based on a predicted measure of preference of a user associated with an item category, in accordance with one or more embodiments, the online system 140 also may retrieve (step 305, e.g., using the preference module 215) additional types of data (e.g., from the data store 240). Examples of such types of data include: user data associated with other users of the online system 140, item data, order data, or recipe data. The data retrieved 305 by the online system 140 may include explicit or implicit information associated with the user. Explicit information associated with the user may be received from the user and directly express the user's preference associated with an item category, while implicit information associated with the user may be received from the user or other users and indirectly express the user's preference associated with an item category.

In some embodiments, the online system 140 assigns (e.g., using the cohort assignment module 216) the user to one or more user cohorts. As described above, a user cohort refers to one or more users who share one or more characteristics. The online system 140 may assign the user to the user cohort(s) based on the set of user data for the user. The online system 140 also may assign the user to the user cohort(s) based on a set of rules (e.g., one or more rules describing user characteristics that the online system 140 may use to assign users to user cohorts, one or more rules indicating whether a user may be assigned to more than one user cohort, etc.). In some embodiments, the online system 140 uses user embeddings describing users to assign the user to the user cohort(s). These embeddings may be generated by one or more machine-learning models and may be stored (e.g., in the data store 240). Information identifying the user cohort(s) to which the user is assigned may be stored in association with user data for the user (e.g., in the data store 240).

As shown in FIG. 4, the online system 140 may then predict (e.g., using the preference module 215) a measure of preference of the user associated with an item category. For example, in predicting a measure of preference of a user associated with an item category, the online system 140 may predict one or more values describing a quantity, an amount, a percentage, or any other suitable measurement of an attribute (e.g., size, color, weight, etc.) of a set of items included in the item category the user prefers. The online system 140 may make the prediction based on the data it retrieved 305 (e.g., from the data store 240) or based on any other suitable types of data. When predicting the measure of preference of the user associated with the item category, the online system 140 may associate (e.g., using the preference module 215) different weights with different types of information used to make the prediction. The online system 140 may do so based on whether the measure of preference is being predicted based on explicit or implicit information associated with the user (e.g., by weighting explicit information more heavily than implicit information).

Referring back to FIG. 3, in some embodiments, the online system 140 predicts the measure of preference of the user associated with the item category using a preference prediction model. A preference prediction model is a machine-learning model trained to predict a measure of preference of a user associated with an item category. In some embodiments, the online system 140 may train (e.g., using the machine-learning training module 230) the preference prediction model via supervised learning or using any other suitable technique or combination of techniques based on various types of data (e.g., stored in the data store 240). To use the preference prediction model, the online system 140 may access 310 (e.g., using the preference module 215) the model (e.g., from the data store 240) and apply 315 (e.g., using the preference module 215) the model to a set of inputs. The set of inputs may include various types of data retrieved 305 by the online system 140 described above (e.g., user data, item data, order data, or recipe data). Once the online system 140 applies 315 the preference prediction model to the set of inputs, the online system 140 may then receive (e.g., via the preference module 215) an output from the model. The output may include one or more values corresponding to the measure of preference of the user associated with the item category. The measure of preference of the user associated with the item category may then be stored among a set of user data for the user (e.g., in the data store 240).

In embodiments in which the user is assigned to a user cohort, the online system 140 predicts (e.g., using the preference module 215) a measure of preference of the user cohort associated with the item category. Similar to predicting the measure of preference of the user associated with the item category, the online system 140 may predict the measure of preference of the user cohort associated with the item category based on various types of data (e.g., user data, item data, order data, or recipe data) it retrieved 305 (e.g., from the data store 240). The online system 140 may predict the measure of preference of the user cohort associated with the item category in a manner analogous to that described above (e.g., by associating different weights with different types of information used to make the prediction, by using the preference prediction model, etc.).

For an item included in the item category, the online system 140 then generates 320 (e.g., using the prompting module 217) a prompt that requests generation of a set of images of the item that is consistent with the predicted measure of preference of the user or the user cohort associated with the item category. For example, the online system 140 may generate a prompt that includes various types of data, such as text data, image data, video data, audio data, or any other suitable types of data. In some embodiments, the prompt requests generation of a set of images of the item that is consistent with multiple predicted measures of preference of the user or the user cohort associated with the item category. The prompt also or alternatively may request generation of a set of videos, a verbal or a written description, or any other suitable types of information describing the item that is consistent with the predicted measure of preference of the user or the user cohort associated with the item category.

Once the online system 140 generates 320 the prompt, the online system 140 may provide 325 (e.g., using the prompting module 217) the prompt to a generative artificial intelligence (AI) model 400 to obtain an output, as shown in FIG. 4. The generative AI model 400 may be a multi-modal large language model or any other suitable type of generative AI model. The output of the generative AI model 400 may include a set of images of the item that is consistent with the predicted measure of preference of the user or the user cohort associated with the item category. In embodiments in which the prompt requests generation of a set of videos, a verbal or a written description, or any other suitable types of information describing the item that is consistent with the predicted measure of preference of the user or the user cohort associated with the item category, the output may include a corresponding set of videos, verbal or written description, etc. In some embodiments, the generative AI model 400 is trained by the online system 140 (e.g., using the machine-learning training module 230).

Referring back to FIG. 3, the online system 140 then extracts 330 (e.g., using the extraction module 218) the set of images from the output of the generative AI model 400. In embodiments in which the output of the generative AI model 400 includes other types of content (e.g., text, audio, or video content), the online system 140 also may extract 330 the content. The online system 140 may do so using various techniques, such as computer-vision techniques (e.g., object detection, image identification, and image classification), one or more natural language processing (NLP) techniques, etc.

Once the online system 140 extracts 330 the set of images from the output of the generative AI model 400, the online system 140 may update 335 (e.g., using the data collection module 200) the database of items by storing the extracted set of images in a database record associated with the item (e.g., in the data store 240, as shown in FIG. 4). In embodiments in which the online system 140 extracts 330 the set of images generated by the generative AI model 400 for the user (e.g., based on a prompt that requests generation of the set of images of the item that is consistent with the predicted measure of preference of the user associated with the item category), the extracted set of images may be stored in association with information identifying the user. Similarly, in embodiments in which the online system 140 extracts 330 the set of images generated by the generative AI model 400 for the user cohort, the extracted set of images may be stored in association with information identifying the user cohort. In embodiments in which the online system 140 extracts 330 other types of content associated with the item generated by the generative AI model 400, the extracted content may be stored in a manner analogous to that described above.

The online system 140 may then receive (e.g., via the interface module 211) a request from a user client device 100 associated with the user to access a set of items available to the user (e.g., a catalog of all items that are available to the user, which the user can browse to select items to order). The online system 140 may generate (e.g., using the interface module 211) a user interface including a depiction of the set of items for display to the user client device 100. In various embodiments, the online system 140 populates (e.g., using the interface module 211) the user interface with additional types of information (e.g., one or more videos, descriptions, etc.) associated with the set of items.

The following illustrates an example of how the online system 140 may generate the user interface. Suppose that the request is received from the user client device 100 associated with the user to access the ordering interface. In this example, the online system 140 may identify (e.g., using the scoring module 212, the ranking module 213, and the selection module 214) various items to be included in the ordering interface. In this example, if the item is included among the items to be included in the ordering interface, the online system 140 may access (e.g., using the selection module 214) the database of items (e.g., stored in the data store 240) and retrieve (e.g., using the selection module 214) the database record associated with the item. In the above example, the online system 140 may then retrieve (e.g., using the selection module 214) the set of images of the item from the database record that is stored in association with information identifying the user. Alternatively, in this example, the online system 140 may access (e.g., using the selection module 214) a set of user data for the user (e.g., stored in the data store 240), retrieve (e.g., using the selection module 214) information describing the user cohort to which the user is assigned, and retrieve the set of images of the item from the database record that is stored in association with information identifying the user cohort. Continuing with this example, the online system 140 may then include the set of images of the item in the ordering interface when generating it. In the above example, the online system 140 also may retrieve (e.g., using the selection module 214) other types of item data for the item from the database record (e.g., one or more videos depicting the item, a description of the item, etc.) that are stored in association with information identifying the user or the user cohort and include the item data for the item in the ordering interface.

Figure 5A:
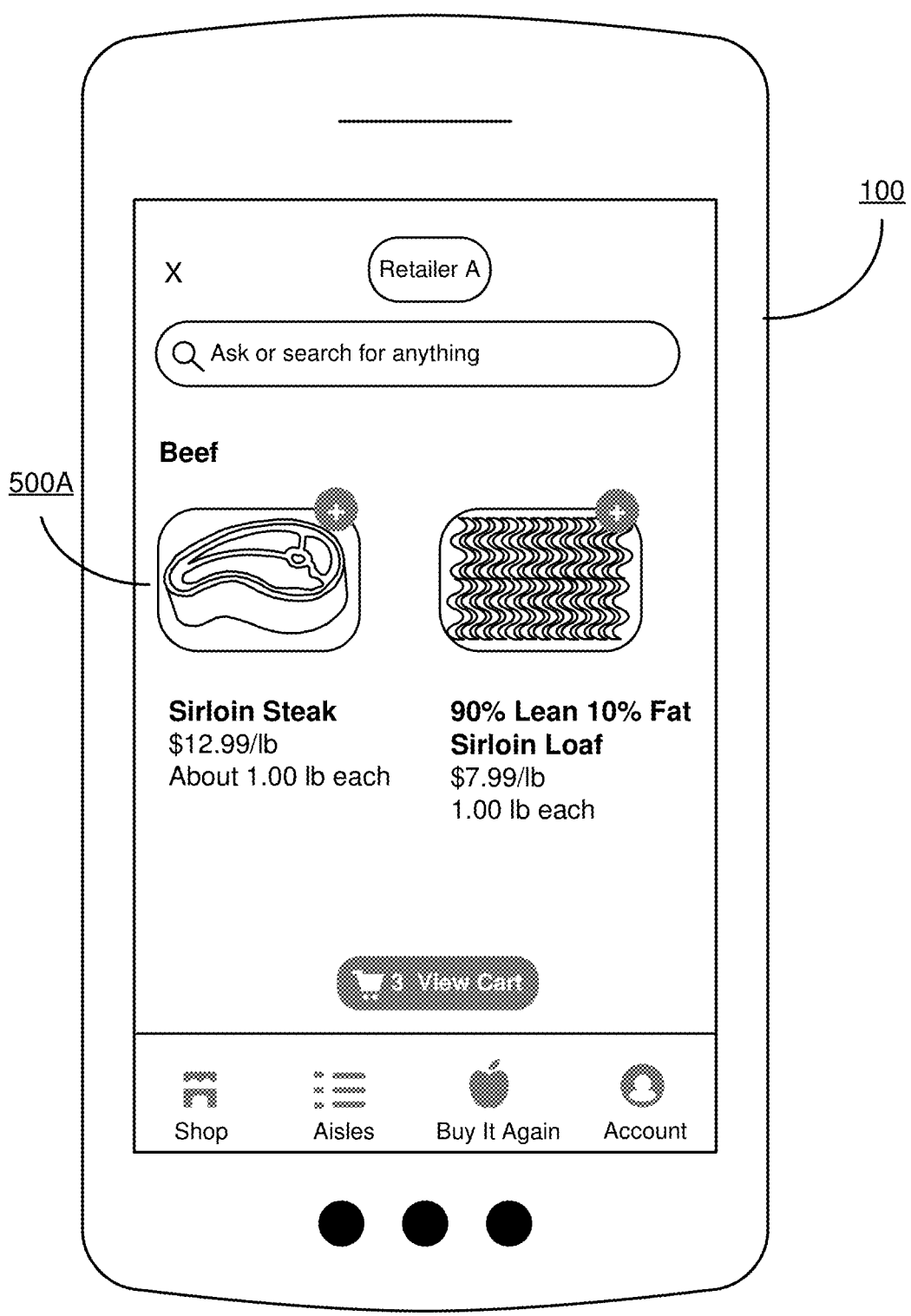
FIGS. 5A-5B illustrate examples of a user interface including images of items included among an inventory at a retailer, in accordance with one or more embodiments.
Figure 5B:
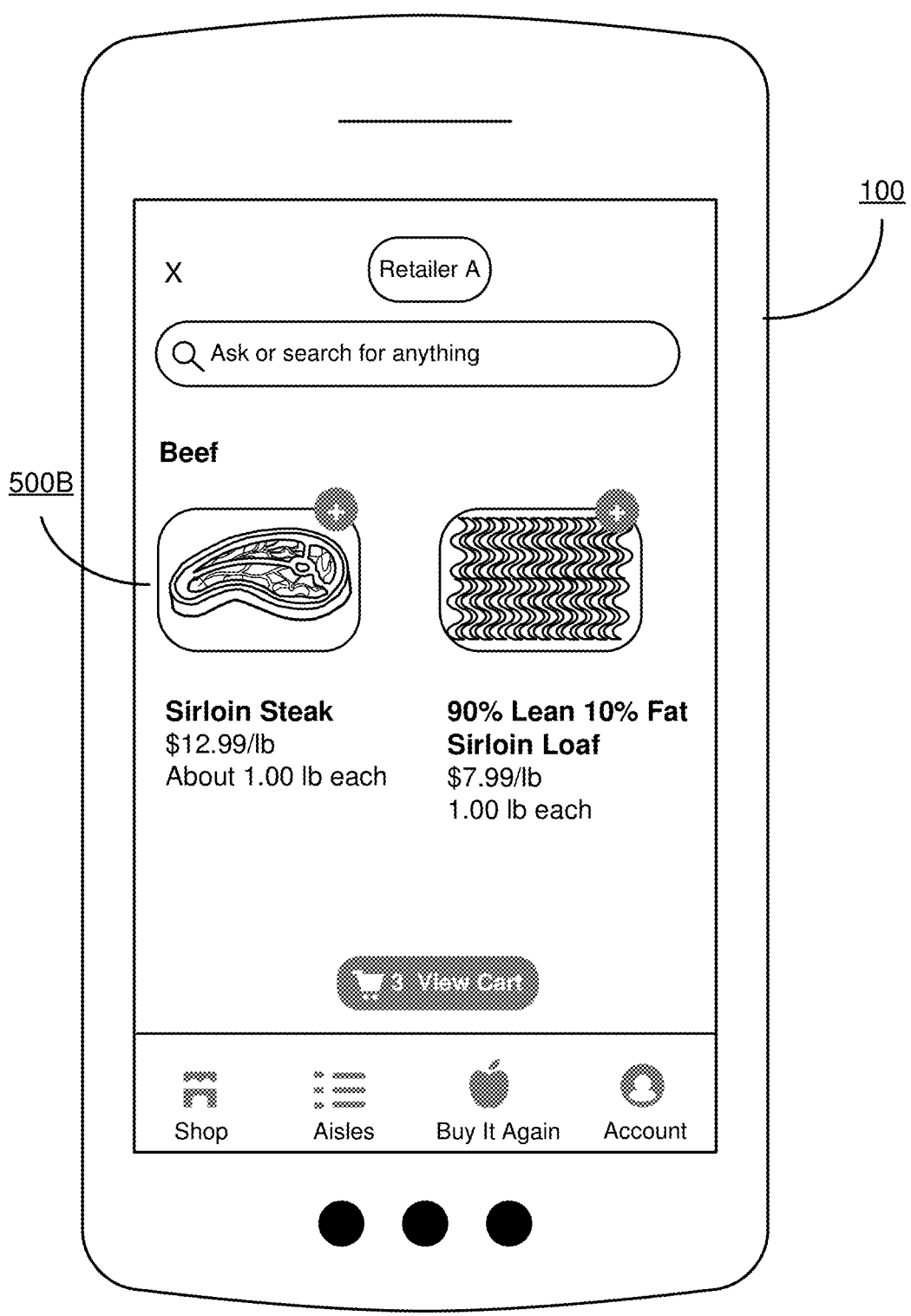

The online system 140 may then send (e.g., via the interface module 211) the user interface to the user client device 100, causing the user client device 100 to display the user interface. FIGS. 5A and 5B illustrate examples of a user interface including images of items included among an inventory at a retailer, in accordance with one or more embodiments. Referring first to the example of FIG. 5A, suppose that the item category corresponds to a "steak" item category and that the prompt requested generation of a set of images of a sirloin steak that is consistent with multiple predicted measures of preference of the user or the user cohort associated with the item category. In this example, suppose also that the predicted measures of preference of the user or the user cohort associated with the item category correspond to values describing an amount of a marbling attribute and a measurement of a thickness attribute associated with a set of items included in the item category the user prefers. In this example, the user interface sent for display to the user client device 100 associated with the user may include an image 500A of the sirloin steak that is consistent with the predicted measures of preference of the user or the user cohort associated with the item category. Alternatively, suppose that the predicted measures of preference of the user or the user cohort associated with the item category correspond to values describing a greater amount of a marbling attribute and a smaller measurement of a thickness attribute associated with the set of items included in the item category the user prefers. In this example, the user interface sent for display to the user client device 100 associated with the user may include a different image 500B of the sirloin steak that is consistent with the predicted measures of preference of the user or the user cohort associated with the item category, as shown in the example of FIG. 5B.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   retrieving a set of user data for a user of an online system;
   accessing a machine-learning model trained to predict a measure of preference of the user associated with an item category, wherein the machine-learning model is trained by:
      receiving user data for a plurality of users of the online system,
      receiving, for each user of the plurality of users, a label describing the measure of preference of a corresponding user associated with the item category, and
      training the machine-learning model based at least in part on the user data and the label for each user of the plurality of users;
   applying the machine-learning model to predict the measure of preference of the user associated with the item category based at least in part on the set of user data for the user;
   for an item included in the item category, generating a prompt that requests generation of an image of the item that is consistent with the predicted measure of preference of the user associated with the item category;
   providing the prompt to a generative artificial intelligence model to obtain an output;
   extracting, from the output, the image of the item that is consistent with the predicted measure of preference of the user associated with the item category;
   updating a database of items by storing the extracted image of the item in a database record associated with the item;
   receiving a future request by a different user that will result in a display of the item;
   determining, from stored data relating to the different user, that the different user is part of a user cohort to which the user belongs, wherein the different user shares the predicted measure of preference; and
   retrieving for display, in association with the future request, the image.

2. The method of claim 1, further comprising:
   receiving a request from a user client device associated with the user to access a set of items available to the user for acquisition;
   responsive to receiving the request, generating a user interface for display to the user client device associated with the user, wherein the user interface comprises a depiction of the item; and
   sending the user interface to the user client device associated with the user, wherein sending the user interface causes the user client device to display the user interface.

3. The method of claim 2, wherein generating the user interface for display to the user client device associated with the user comprises:
   accessing the updated database of items;
   retrieving the database record associated with the item from the updated database of items;
   retrieving the extracted image of the item from the database record based at least in part on the set of user data for the user; and
   including the extracted image of the item in the user interface.

4. The method of claim 1, wherein updating the database of items by storing the extracted image of the item in the database record associated with the item comprises:
   storing the extracted image of the item in the database record associated with the item in association with information identifying one or more of: the user or a user cohort to which the user is assigned.

5. The method of claim 4, further comprising:
   storing, in association with each image of the plurality of images of the item, information identifying one or more of a user or a user cohort.

6. The method of claim 1, wherein applying the machine-learning model to predict the measure of preference of the user associated with the item category based at least in part on the set of user data for the user comprises:
   applying the machine-learning model to predict the measure of preference of the user associated with the item category based at least in part on a set of images of one or more items previously acquired by the user and a measurement of an attribute of each item of the one or more items, wherein the one or more items are included in the item category.

7. The method of claim 1, wherein applying the machine-learning model to predict the measure of preference of the user associated with the item category based at least in part on the set of user data for the user comprises:
   applying the machine-learning model to predict the measure of preference of the user associated with the item category based at least in part on historical information associated with the user.

8. The method of claim 7, wherein applying the machine-learning model to predict the measure of preference of the user associated with the item category based at least in part on the historical information associated with the user comprises:
   applying the machine-learning model to predict the measure of preference of the user associated with the item category based at least in part on a set of interactions between the user and one or more of: a picker associated with the online system or an employee associated with a retailer location.

9. The method of claim 8, wherein the set of interactions comprises one or more of: a written exchange of information between a user client device associated with the user and a picker client device associated with the picker or a verbal exchange of information between the user and the employee associated with the retailer location.

10. The method of claim 7, wherein applying the machine-learning model to predict the measure of preference of the user associated with the item category based at least in part on the historical information associated with the user comprises:
   applying the machine-learning model to predict the measure of preference of the user associated with the item category based at least in part on one or more of: a set of images of one or more items included in the item category captured at a retailer location, information indicating a distance between a location associated with the user and a location associated with the one or more items within the retailer location was less than a threshold distance, or information indicating whether the user acquired the one or more items from the retailer location.

11. A computer program product comprising a non-transitory computer-readable storage medium having instructions encoded thereon that, when executed by a processor, cause the processor to perform steps comprising:
retrieving a set of user data for a user of an online system;
accessing a machine-learning model trained to predict a measure of preference of the user associated with an item category, wherein the machine-learning model is trained by:
receiving user data for a plurality of users of the online system,
receiving, for each user of the plurality of users, a label describing the measure of preference of a corresponding user associated with the item category, and
training the machine-learning model based at least in part on the user data and the label for each user of the plurality of users;
applying the machine-learning model to predict the measure of preference of the user associated with the item category based at least in part on the set of user data for the user;
for an item included in the item category, generating a prompt that requests generation of an image of the item that is consistent with the predicted measure of preference of the user associated with the item category;
providing the prompt to a generative artificial intelligence model to obtain an output;
extracting, from the output, the image of the item that is consistent with the predicted measure of preference of the user associated with the item category;
updating a database of items by storing the extracted image of the item in a database record associated with the item;
receiving a future request by a different user that will result in a display of the item;
determining, from stored data relating to the different user, that the different user is part of a user cohort to which the user belongs, wherein the different user shares the predicted measure of preference; and
retrieving for display, in association with the future request, the image.

12. The computer program product of claim 11, wherein the computer-readable storage medium further has instructions encoded thereon that, when executed by the processor, cause the processor to perform steps comprising:
receiving a request from a user client device associated with the user to access a set of items available to the user for acquisition;
responsive to receiving the request, generating a user interface for display to the user client device associated with the user, wherein the user interface comprises a depiction of the item; and
sending the user interface to the user client device associated with the user, wherein sending the user interface causes the user client device to display the user interface.

13. The computer program product of claim 12, wherein generating the user interface for display to the user client device associated with the user comprises:
accessing the updated database of items;
retrieving the database record associated with the item from the updated database of items;
retrieving the extracted image of the item from the database record based at least in part on the set of user data for the user; and
including the extracted image of the item in the user interface.

14. The computer program product of claim 11, wherein updating the database of items by storing the extracted image of the item in the database record associated with the item comprises:
storing the extracted image of the item in the database record associated with the item in association with information identifying one or more of: the user or a user cohort to which the user is assigned.

15. The computer program product of claim 14, wherein updating the database of items comprises:
storing, in association with each image of the plurality of images of the item, information identifying one or more of a user or a user cohort.

16. The computer program product of claim 11, wherein applying the machine-learning model to predict the measure of preference of the user associated with the item category based at least in part on the set of user data for the user comprises:
applying the machine-learning model to predict the measure of preference of the user associated with the item category based at least in part on a set of images of one or more items previously acquired by the user and a measurement of an attribute of each item of the one or more items, wherein the one or more items are included in the item category.

17. The computer program product of claim 11, wherein applying the machine-learning model to predict the measure of preference of the user associated with the item category based at least in part on the set of user data for the user comprises:
applying the machine-learning model to predict the measure of preference of the user associated with the item category based at least in part on historical information associated with the user.

18. The computer program product of claim 17, wherein applying the machine-learning model to predict the measure of preference of the user associated with the item category based at least in part on the historical information associated with the user comprises:
applying the machine-learning model to predict the measure of preference of the user associated with the item category based at least in part on a set of interactions between the user and one or more of: a picker associated with the online system or an employee associated with a retailer location.

19. The computer program product of claim 18, wherein the set of interactions comprises one or more of: a written exchange of information between a user client device associated with the user and a picker client device associated with the picker or a verbal exchange of information between the user and the employee associated with the retailer location.

20. A computer system comprising:
a processor; and
a non-transitory computer-readable storage medium storing instructions that, when executed by the processor, perform actions comprising:
retrieving a set of user data for a user of an online system;

accessing a machine-learning model trained to predict a measure of preference of the user associated with an item category, wherein the machine-learning model is trained by:
  receiving user data for a plurality of users of the online system,
  receiving, for each user of the plurality of users, a label describing the measure of preference of a corresponding user associated with the item category, and
  training the machine-learning model based at least in part on the user data and the label for each user of the plurality of users;
applying the machine-learning model to predict the measure of preference of the user associated with the item category based at least in part on the set of user data for the user;
for an item included in the item category, generating a prompt that requests generation of an image of the item that is consistent with the predicted measure of preference of the user associated with the item category;
providing the prompt to a generative artificial intelligence model to obtain an output;
extracting, from the output, the image of the item that is consistent with the predicted measure of preference of the user associated with the item category;
updating a database of items by storing the extracted image of the item in a database record associated with the item;
receiving a future request by a different user that will result in a display of the item;
determining, from stored data relating to the different user, that the different user is part of a user cohort to which the user belongs, wherein the different user shares the predicted measure of preference; and
retrieving for display, in association with the future request, the image.

* * * * *